(12) United States Patent
Peck et al.

(10) Patent No.: US 7,368,832 B2
(45) Date of Patent: May 6, 2008

(54) CIRCUIT AND FAULT TOLERANT ASSEMBLY INCLUDING SUCH CIRCUIT

(75) Inventors: Kevin Peck, Sonora, CA (US); Ronald D. VanOrden, Sonora, CA (US); Noel H. Johnson, Sonora, CA (US); Thomas J. Berdner, Sonora, CA (US); Robin H. Slater, Sonora, CA (US)

(73) Assignee: MRL Industries, Sonora, CA (US)

( * ) Notice: Subject to any disclaimer, the term of this patent is extended or adjusted under 35 U.S.C. 154(b) by 407 days.

(21) Appl. No.: 10/671,777

(22) Filed: Sep. 29, 2003

(65) Prior Publication Data

US 2004/0130920 A1    Jul. 8, 2004

Related U.S. Application Data

(60) Provisional application No. 60/414,347, filed on Sep. 30, 2002.

(51) Int. Cl.
*H02J 3/00* (2006.01)
*H05B 3/02* (2006.01)

(52) U.S. Cl. ............... 307/32; 361/65; 219/485

(58) Field of Classification Search ............ 219/485; 361/65
See application file for complete search history.

(56) References Cited

U.S. PATENT DOCUMENTS

| | | | | |
|---|---|---|---|---|
| 3,603,817 A | | 9/1971 | Casson ............... 327/403 |
| 4,010,412 A | * | 3/1977 | Forman ............... 323/236 |
| 4,282,422 A | * | 8/1981 | Payne et al. ........... 219/486 |
| 4,340,807 A | * | 7/1982 | Raskin et al. .......... 219/497 |
| 4,377,739 A | * | 3/1983 | Eckert et al. .......... 219/497 |
| 4,633,067 A | * | 12/1986 | Payne et al. ........... 219/483 |
| 4,634,843 A | * | 1/1987 | Payne ................. 219/486 |
| 4,786,799 A | * | 11/1988 | Welle et al. ........... 219/486 |
| 4,829,159 A | * | 5/1989 | Braun et al. ........... 219/486 |
| 4,967,100 A | | 10/1990 | Okutsu et al. .......... 327/111 |
| 5,293,028 A | * | 3/1994 | Payne ................. 219/486 |
| 5,689,230 A | | 11/1997 | Merwin et al. ........ 340/310.11 |
| 6,246,831 B1 | * | 6/2001 | Seitz et al. ............ 392/486 |
| 6,614,133 B2 | | 9/2003 | Belson et al. .......... 307/58 |
| 2002/0101743 A1 | * | 8/2002 | Kallus et al. .......... 363/34 |

OTHER PUBLICATIONS

International Search Report mailed Apr. 22, 2004, in International Application No. PCT/US03/30745.

* cited by examiner

*Primary Examiner*—Michael Sherry
*Assistant Examiner*—Hal I Kaplan
(74) *Attorney, Agent, or Firm*—Drinker Biddle & Reath LLP

(57) ABSTRACT

A circuit is provided that provides for the same power characteristics to an assembly of electrical resistive elements wired in parallel as to the assembly as wired in series. An input power source provides electrical resistive power to a plurality of load elements, wherein the plurality of load elements are connected in parallel to each other. A plurality of power splitters divide the power source into separate and equal power subsources such that there is one power splitter and one power subsource for each load element, wherein the power provided to each of the plurality of load elements is equal to the power of the electrical power source. Redundancy and fault tolerance is provided to the circuitry by permitting remaining load elements to continue to operate should one or more load elements fail.

9 Claims, 5 Drawing Sheets

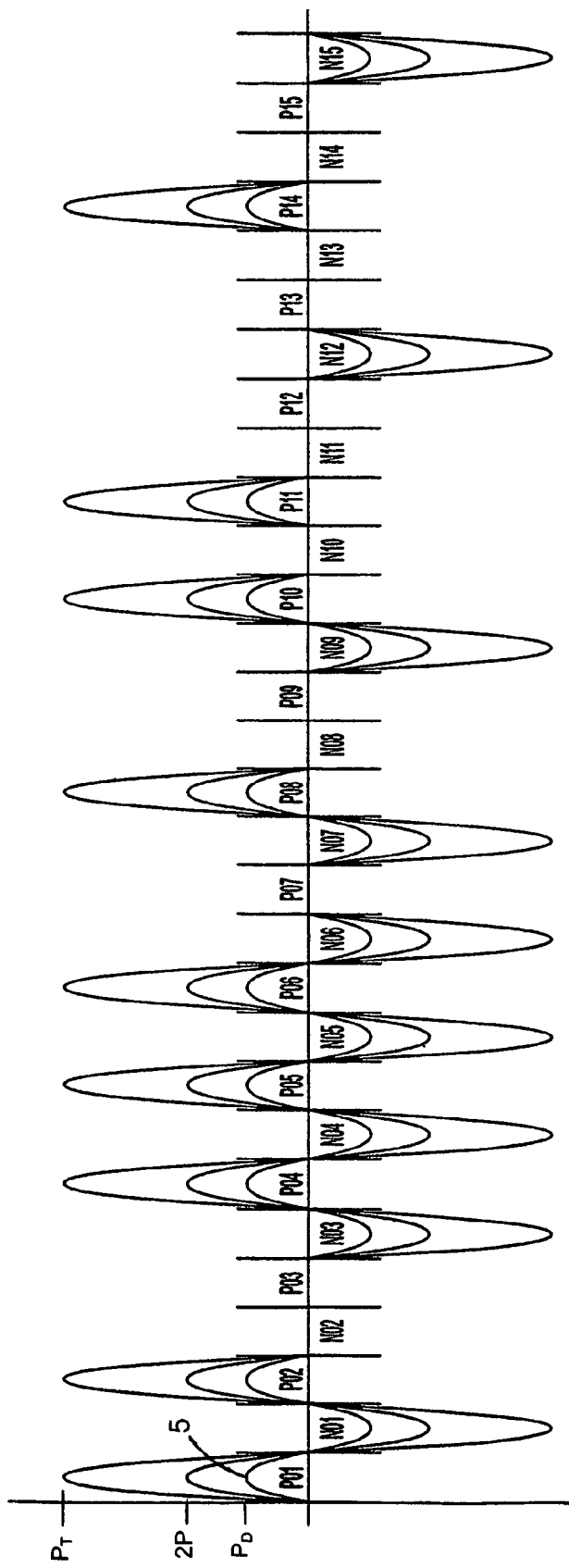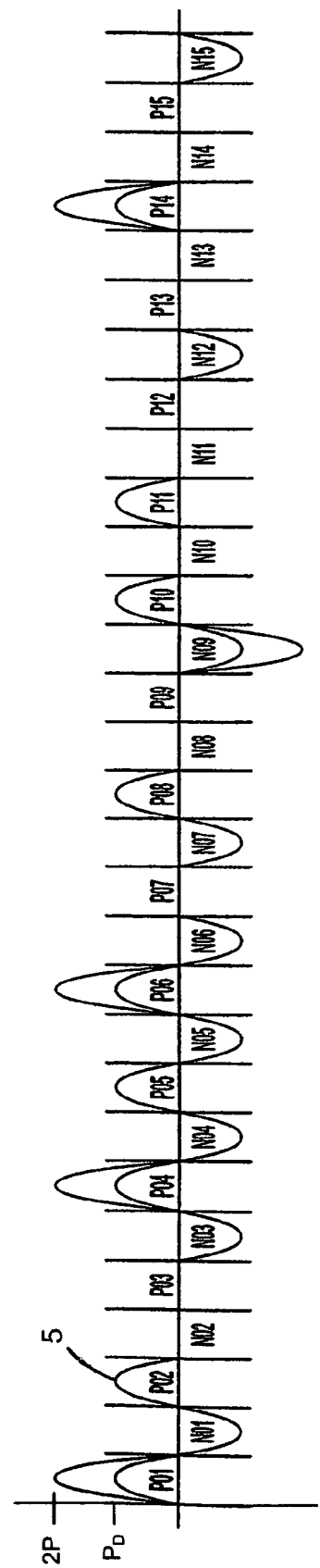
FIG. 1D
FIG. 1E

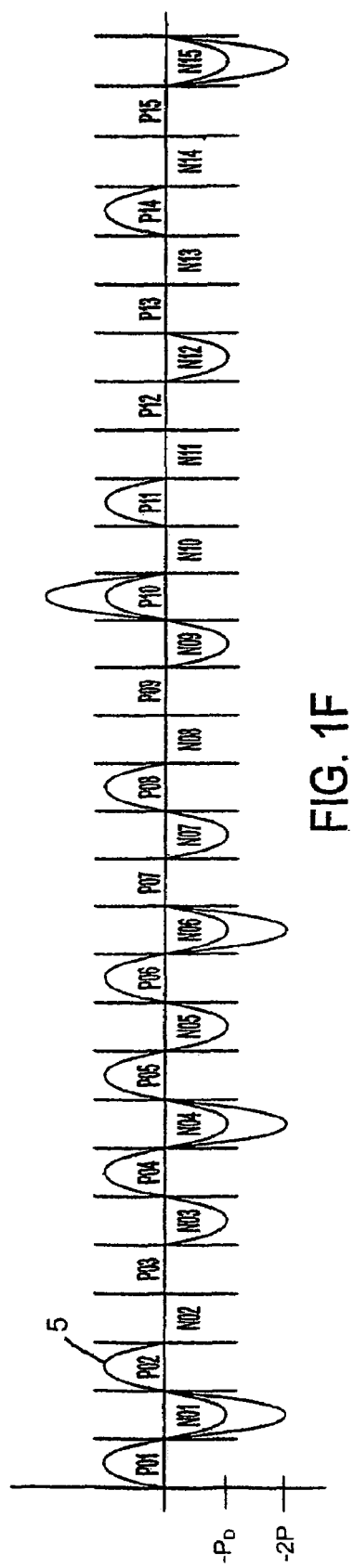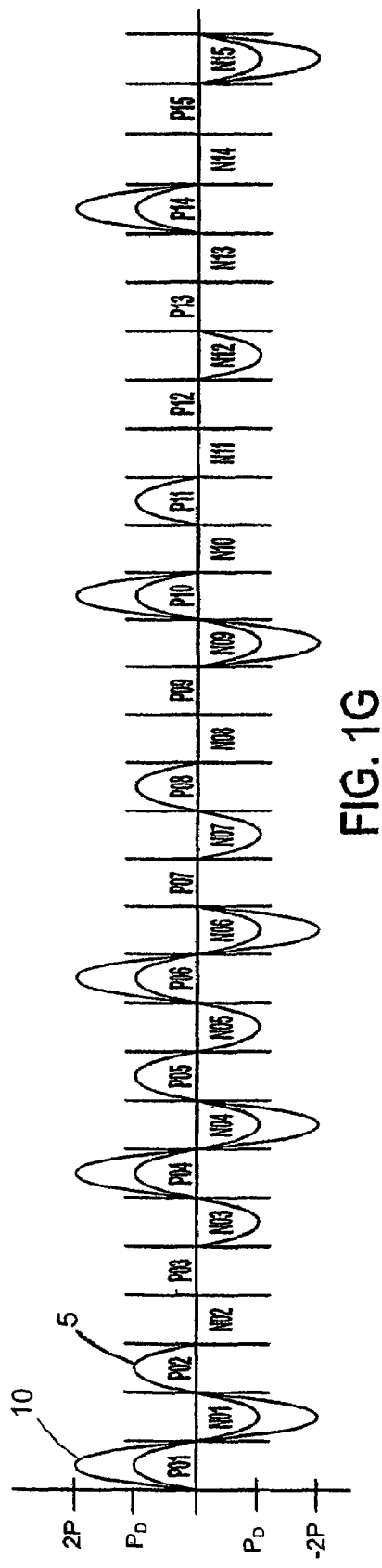
FIG. 1F
FIG. 1G

CIRCUIT AND FAULT TOLERANT ASSEMBLY INCLUDING SUCH CIRCUIT

CROSS-REFERENCE TO RELATED APPLICATION

This application is based upon and claims priority from U.S. provisional patent application No. 60/414,347, filed Sep. 30, 2002, the contents of which are incorporated herein by reference.

FIELD OF THE INVENTION

The present invention is directed to an electrical circuit. More particularly, exemplary embodiments are directed to an electrical circuit that provides the same power characteristics to a plurality of elements wired in parallel as provided to a corresponding assembly wired in series.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to present embodiments.

It is common in the semiconductor industry to utilize compact resistive heating element assemblies to heat a material to a desired temperature. An example of such an application is the heating of a hydrogen and oxygen gas stream in order to produce a high-purity steam.

These heating element assemblies are usually quite small in size and are designed to run from standard 120V AC nominal voltage. The combination of the physical size limitations and high voltage lead to the selection of relatively small wire diameters for the resistance heater. The use of small wire diameters can in turn lead to more frequent failures of the elements than is desirable.

In many cases, the above-described heating element assemblies can consist of two half-sections wired in series to obtain the desired electrical characteristics. If the heating elements were wired in parallel, for example, the resistance would be relatively low; and more power would be required to heat the elements to proper temperatures. One consequence of this typical in-series connection is that when one half of the element fails, the entire unit is disabled. The failure of the entire heating element assembly during a process run can generate a potentially unsafe condition and can lead to the workpieces of the process run in the furnace at that time being scrapped or requiring reworking. Scrapped lots and rework have obvious detrimental efficiency and economic implications.

In light of the above, it would be advantageous to change the connection of the two halves to a parallel configuration, so as to avoid the total failure from the failure of a single heating element. However, changing from a series connection to a parallel wiring configuration normally involves changing the heating element wire to a smaller gauge so that the parallel connection retains the same electrical characteristics as the series connection, which is necessary in order to be able to use the same power supply controls.

This problem can be described by reference to the following expressions and calculations.

Assuming a series and parallel connection of a two-section heating element assembly, the total resistance for the series connection is:

$$R_s = R_1 + R_2$$

where $R_s$ is the total resistance of the series connection, $R_1$ is the resistance of the first section, and $R_2$ is the resistance of the second section. The total resistance of the arrangement wired in parallel is:

$$1/R_p = 1/R_1 + 1/R_2$$

where Rp is the total resistance of the parallel connection. Assuming that the resistance of the first and second sections are the same ($R_1 = R_2$), the above expressions can be simplified as follows:

$$R_s = 2R$$

$$1/R_p = 2/R$$

$$R_p = R/2$$

Thus, in order to render the resistance of the series and parallel connections equal:

$$R_s = R_p$$

$$2R_{(s)} = R_{(p)}/2$$

$$R_p = 4 \times R_s$$

Thus, in the above example, the resistance must be increased by four-fold in order to switch from a series configuration to a parallel configuration.

According to the following expression it is known that resistance is inversely proportional to the gauge of a round wire:

$$R = \rho L/A = \rho L/\Pi r^2$$

where $\rho$ is the resistivity constant, L is the length of the wire, A is the cross-sectional area of the wire, and r is the radius of the wire. Thus a decrease in the cross-sectional area of the wire will result in the desired increase in resistance.

However, as mentioned above, resorting to smaller diameter heating element wires can greatly reduce the life and reliability of the element assembly.

Therefore, it would be desirable to provide a mechanism to permit the parallel connection of a plurality of resistive elements without resorting to reduction in the gauge of the wires.

SUMMARY OF THE INVENTION

According to exemplary embodiments, the above-mentioned problems and other related problems of the prior art are addressed. For example, the embodiments provide a more robust heating element assembly that is less prone to failure, wherein failure of even one section of heating elements does not cause failure of the entire assembly. Exemplary embodiments provide for potentially significant improvement in the operative lifetimes of such assemblies, and potentially significant reduction in scrap and rework rates when compared with conventional heating element assemblies.

According to one aspect, exemplary embodiments provide a circuit permitting an electric heating load to be divided among a plurality of sections for redundancy and then restored to the same effective average power at a given power input level. Incoming power normally destined to be delivered to two series-connected resistive heating loads or element sections is time proportionally distributed on a per half wave cycle basis to the halves of the heating loads. The circuit can be also be configured for other multiples of element sections as well as skipping a number of cycles between each cycle. Such embodiments balance the power over the collection of heating elements and permit the remaining elements to continue operation in the event one or more elements fail.

Embodiments provide a circuit for presenting a fractional wave of alternating current (AC) to each of a plurality of devices connected thereto. According to one embodiment, the circuit comprises a rectifier. According to a further embodiment, the circuit comprises at least one semiconductor device. According to yet another embodiment, the circuit comprises at least one silicon control rectifier (SCR). According to a further embodiment, the circuit comprises a pair of SCR's. According to a further embodiment, the circuit comprises a SCR module. According to another embodiment the circuit comprises a plurality of terminals. According to yet another embodiment, the fractional wave comprises a half wave.

According to another aspect, exemplary embodiments provide for an assembly comprising a power controller, a circuit, and a plurality of resistive heating elements. According to one embodiment, the power controller is adapted for connection to a standard 120V AC power source with nominal voltage. "Standard nominal voltage" is intended to include a standard voltage range for 120V devices, such as a range of 100V to 125V. Embodiments also provide for standard nominal 220V power supplies and even DC power supplies without detracting from the novel features. According to another embodiment, the circuit provides for presenting a fractional wave of alternating current to each of a plurality of devices connected thereto. According to one embodiment, the circuit comprises a rectifier. According to a further embodiment, the circuit comprises at least one semiconductor device.

According to yet another embodiment, the circuit comprises at least one silicon control rectifier (SCR). According to a further embodiment, the circuit comprises a pair of SCR's. According to a further embodiment, the circuit comprises a SCR module. According to another embodiment the circuit comprises a plurality of terminals. According to yet another embodiment, the fractional wave comprises a half wave. According to an additional embodiment, the controller is electrically connected to a first terminal of the circuit, and the plurality of heating elements are electrically connected to a second, and possible additional, terminal(s) of the circuit. According to another embodiment, one-half of the total AC supply voltage is conveyed to each of the pair of heating elements; and, subsequently, the AC supply voltage is limited to fifty percent (50%) of duty cycle. According to another embodiment, when for example the circuit provides for three load elements, the supply voltage is limited to thirty three percent of duty cycle. In such a manner, any number of load elements can be accommodated by exemplary embodiments.

According to yet another embodiment, the plurality of electrical heating elements are connected to the power supply in parallel in such a manner that if one or more elements fail or become out of specification, the remaining heating elements can continue to function properly. According to a further embodiment, the wires of the electrical heating elements are of the same gauge. According to yet a further embodiment, current is drawn evenly from the power source on both the negative and positive sides of the alternating current cycle. According to an additional embodiment, the circuit is further designed to generate an alarm signaling failure and/or an out of specification condition. According to a further embodiment, the circuit includes components for connecting and communicating with one or more thermocouples.

An exemplary embodiment is directed to a circuit to divide an electrical resistive load among a plurality of load elements in parallel, including an electrical power source for providing electrical resistive power to a plurality of load elements, wherein the plurality of load elements are connected in parallel to each other; and a plurality of power splitters for dividing the electrical power source into separate and equal power subsources such that there is one power splitter and one power subsource for each load element, wherein the power provided to each of the plurality of load elements is equal to the power of the electrical power source.

An additional embodiment is directed to a method for dividing an electrical resistive load among a plurality of load elements in parallel, including providing electrical power to a plurality of load elements, wherein the plurality of load elements are connected in parallel to each other; and dividing the electrical power into separate and equal power subsources such that there is one power splitter and one power subsource for each load element, wherein the power provided to each of the plurality of load elements is equal to the power of the electrical power source.

BRIEF DESCRIPTION OF THE DRAWING FIGURES

These and other objects and advantages of exemplary embodiments will become more apparent and more readily appreciated to those skilled in the art from the following description of the exemplary embodiments, taken in conjunction with the accompanying drawings, wherein:

FIG. 1, consisting of FIGS. 1A-1G, is a graphical representation by sine waves of impedance matching of loads in parallel to draw the same power through each load element as in a series configuration.

DETAILED DESCRIPTION OF THE INVENTION

In order to overcome the above-described challenges and to improve reliability, a circuit can be designed, constructed, and assembled according to exemplary embodiments. In one embodiment, a corrective circuit is inserted between a control system and two or more heating elements to provide a fault tolerant assembly for feeding multiple loads with a proportional power supply. While exemplary figures show two load elements or heating elements, more than two loads can be fed by exemplary embodiments, with each load receiving the same power as the power supply to the circuit. One feature of the circuit according to exemplary embodiments is a silicon control rectifier (SCR) that presents only half-wave AC to each load element section at fifty percent duty cycle. This feature presents the same resistance to both the positive and the negative half-cycles of the AC cycle, but only one element is energized during each half-cycle. This can be further illustrated by the following formula:

The effective power of a connection in series:

$P = V^2(2R)^{-1} \times \text{duty cycle}$

Where V=120 volts, R=10 ohms, and duty cycle is 100%.

$P = 120^2 \times (2 \times 10)^{-1} \text{ watts} \times 100\% \text{ duty cycle}$ $P = 14,400 \times (20)^{-1} \text{ watts} \times 100\% \text{ duty cycle}$ P=720 watts The effective power of a connection in parallel:

$P = (V^2(R)^{-1}) \times \text{duty cycle}$

Where V=120 volts, R=10 ohms, and duty cycle is 50%.

$P = (120^2 \times (10)^{-1}) \text{ watts} \times 50\% \text{ duty cycle}$ $P = (14,400 \times (10)^{-1}) \text{ watts} \times 50\% \text{ duty cycle}$ $P = (1440) \text{ watts} \times 50\% \text{ duty cycle}$ P=720 watts In the parallel configuration, according to exemplary embodiments, only one resistance element is connected to the power source, through a corrective circuit such as a SCR, at a time. As shown above, the power remains constant for both the series and the parallel configuration, with the resistance per half remaining constant. Therefore the element wire selection for the parallel configuration can remain unchanged from the series circuit design, with the added benefit of redundancy for exemplary embodiments. Since the employed SCR solution is full wave, the load presented to the controller is still of Unity Power Factor. Current is drawn evenly on both the positive and negative AC half cycles. Element redundancy between the two halves yields fault tolerance where, if one half of the assembly fails, the other half remains in operation allowing the process to complete prior to being required to replace the failed heating element assembly and accordingly being able to avoid scrapping the work in process. It is normally possible to complete the process while running on only 50% of power as would be the case if one half of the element failed.

Figure 1A:
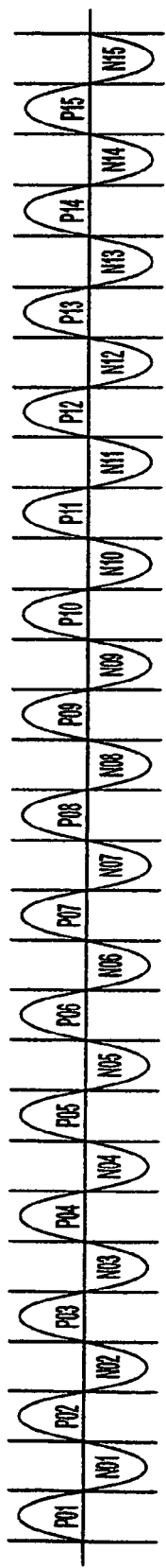
Figure 1B:
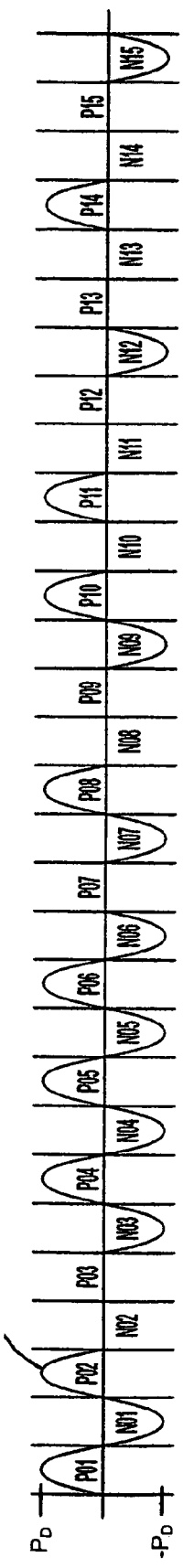
Figure 1C:
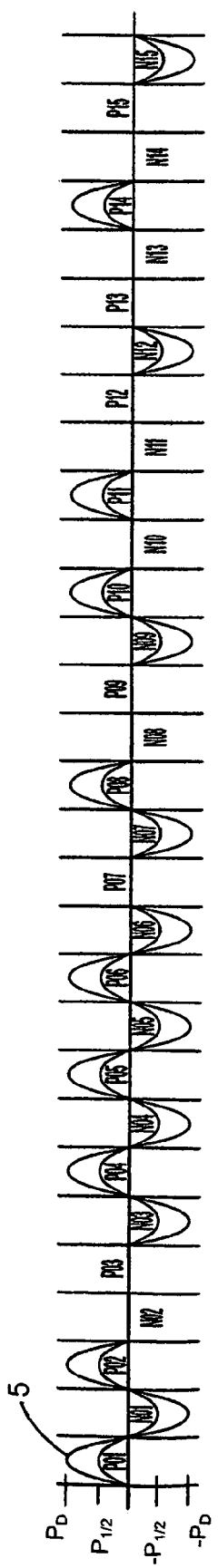

Referring now to FIG. 1, there is shown a graphical representation in the form of sine waves of power balancing by half-cycles for time proportional delivery of power to resistive loads. The graphs shows power (P) as a function of time (t). For example, FIG. 1A graphically illustrates a typical AC power source with positive (P01, P02, P03 . . . Pn) half-cycles and negative (N01, N02, N03 . . . Nn) half-cycles. FIG. 1B represents the time proportional output 5 from the control system to the heating element. The graph illustrates the cycling of the output and represent the desired time-dependent power level ($\pm P_d$). FIG. 1B is reproduced in each of FIGS. 1C to 1G for reference. FIG. 1C shows an existing series connection where each of two element halves receive 50% of the power ($\pm P_{1/2}$) on all half-cycles (corresponding to the half-cycles of the control system output in FIG. 1B) so that sum of the two halves equal the desired power $\pm P_d$ to the resistive element. FIG. 1D shows the effect of connecting two resistive elements in parallel without the corrective circuit of exemplary embodiments. Each half of the element would produce twice the desired power ($\pm 2P$), such that the total power ($\pm P_T$) would be four times the target power level and would overload the circuit. FIG. 1E shows that with exemplary embodiments, one half of the element assembly would receive the first half-cycle P01 at twice the desired power, then would be off for the next three half-cycles N01, P02, N03 of the controlled output 5. FIG. 1F shows the second half of the element assembly, which would receive the second half-cycle N01, and then would be off for the next three half-cycles P02, N03, P04 of the controlled output 5. FIG. 1G shows time proportional power 10 balancing across half-cycles according to an exemplary embodiment, providing a total average power that is consistent with the original desired power level.

Figure 2:
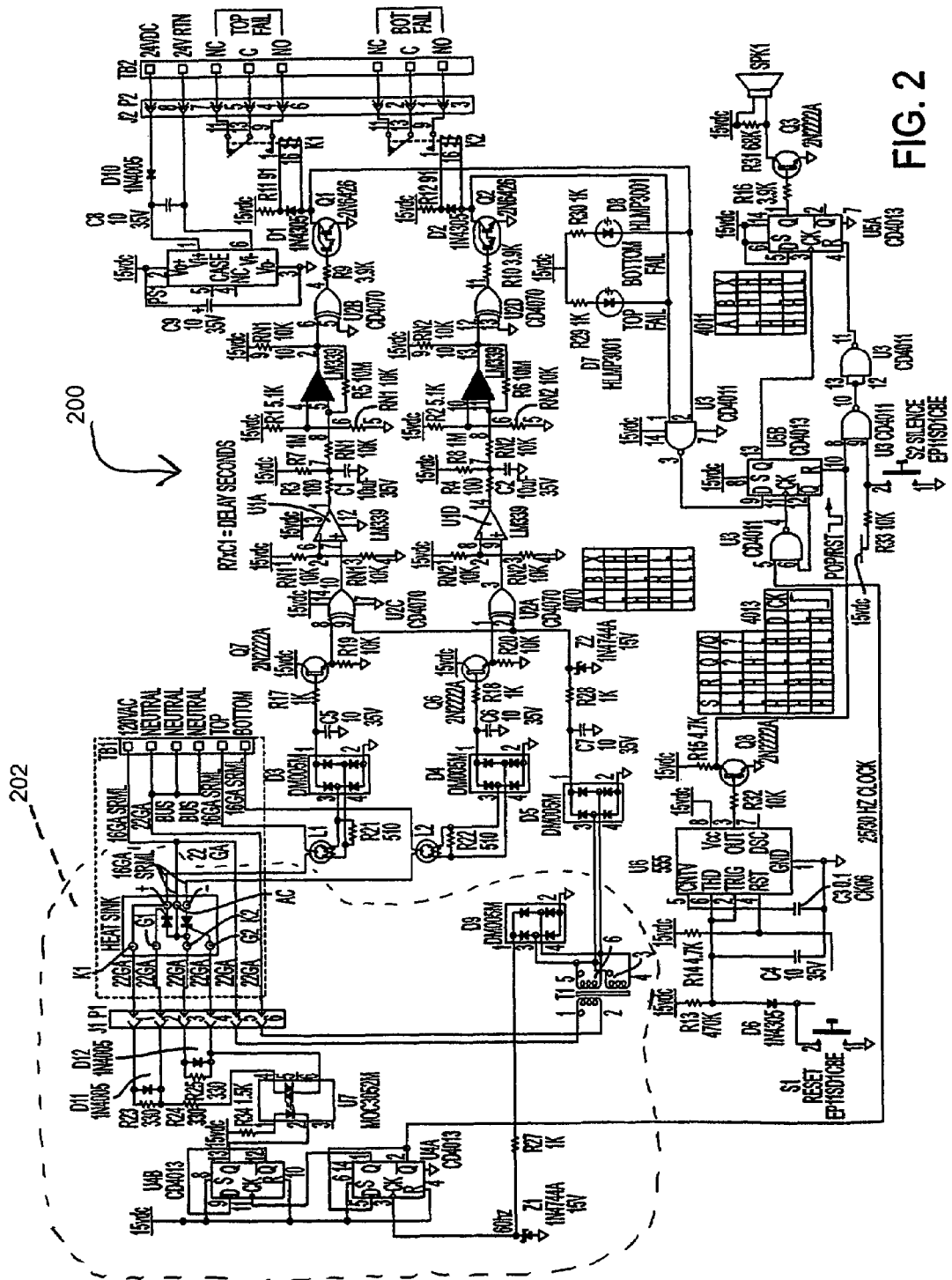
FIG. 2 is a schematic illustration of a circuit constructed according to exemplary embodiments, and optional surrounding components of an assembly connected thereto.

FIG. 2 is a schematic illustration of a exemplary circuit 200 constructed according to exemplary embodiments, and optional surrounding components of an assembly connected thereto. The circuit 200 includes an embodiment of the circuit for proportionally dividing an electrical load among a plurality of load sections 202 shown in FIG. 3. In addition, the circuit 200 includes fault detection circuitry, audible and visual alarm circuitry and reset circuitry.

Figure 3:
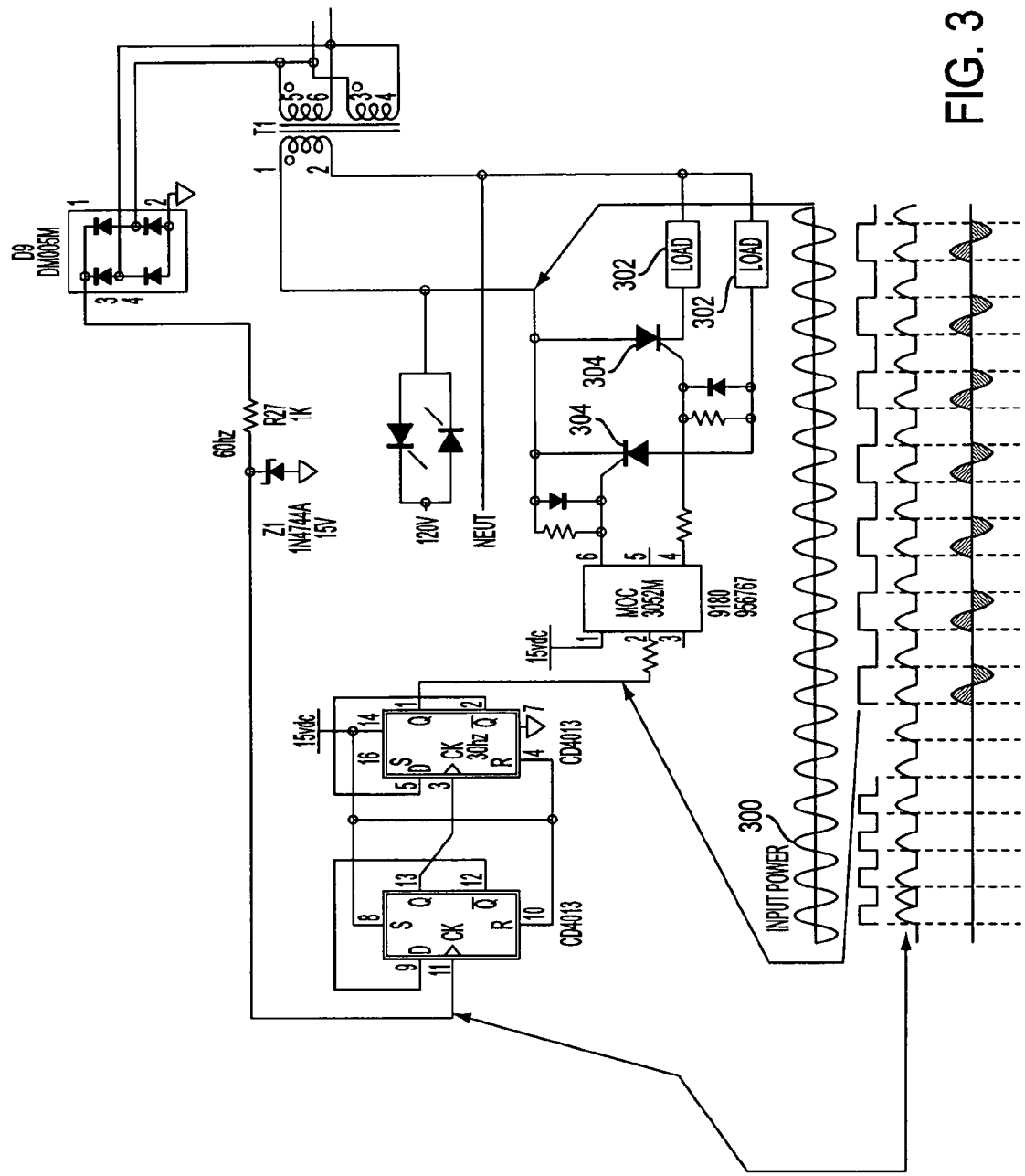
FIG. 3 is a conceptional schematic illustration of a circuit for proportionally dividing an electrical load among a plurality of load sections according to exemplary embodiments.

FIG. 3 shows a conceptional schematic of an exemplary circuit for dividing a resistive load across a plurality of load elements in parallel. An input power supply or power source is shown at 300, wherein the input power supply is divided by half-cycles and applied across the exemplary loads 302. While only two resistive loads 302, such as heating elements, are shown in FIG. 3, more than two resistive loads can be accommodated by exemplary embodiments, with the input power supply divided into as many portions as there are load elements 302. The division of the power supply can be performed by corrective circuit according to an AC time proportional wave form. Alternately, the splitting of the power supply can be by AC phase control. The added silicon control rectifiers for allocating the divided power supply across the load elements 302 in parallel are shown at 304.

Further enhancements to the illustrated circuit are contemplated and include independent alarms to indicate that an element has failed and which one. This provides a mechanism to alert a technician to the problem. Redundancy can be further enhanced by using this signal to select one of two thermocouples where each one would be installed in one section of the element assembly so as to give the best possible control feedback signal when operating on only one half of the heating element assembly.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for proportioning power to a load, comprising:
   dividing an electrical resistive load among a plurality of load elements, the plurality of load elements electrically connected in parallel; and
   dividing an AC power source into a plurality of separate and equal power subsources by repeatedly:
   (a) time proportioning the AC power source, and
   (b) applying a half-cycle of the time-proportioned AC power source sequentially to each of the plurality of load elements,
   wherein a sum of the power provided to the plurality of load elements is equal to the power of the AC power source.

2. The method according to claim 1, including proportioning the electrical power with time to match the electrical power to each power subsource with its respective load element.

3. The method according to claim 1, wherein a Unity Power Factor is realized at the AC power source.

4. The method according to claim 1, wherein any one of the plurality of load elements has redundancy with a second of the plurality of load elements.

5. The method according to claim 4, wherein a failure of any one of the plurality of load elements results in a non-zero reduction in the sum of the power.

6. The method according to claim 4, comprising providing an indicator of a failure condition.

7. The method according to claim 1, comprising regulating the AC power source prior to the step of time proportioning.

8. The method according to claim 7, wherein regulating controls a phase angle of the AC power source.

9. A method for proportioning power to a load, comprising:

dividing an electrical resistive load among a plurality of load elements, the plurality of load elements electrically connected in parallel; and dividing an AC power source into a plurality of separate and equal power subsources by repeatedly:
  (a) phase-angle controlling the AC power source, and
  (b) applying a half-cycle of the phase-angle controlled AC power source sequentially to each of the plurality of load elements, wherein a sum of the power provided to the plurality of load elements is equal to the power of the AC power source.

* * * * *